US011347541B2

(12) United States Patent
Bothello et al.

(10) Patent No.: US 11,347,541 B2
(45) Date of Patent: May 31, 2022

(54) METHODS AND APPARATUS FOR VIRTUAL MACHINE REBALANCING

(71) Applicant: Walmart Apollo, LLC, Bentonville, AR (US)

(72) Inventors: Gerald Bothello, Foster City, CA (US); Surajit Roy, Gilroy, CA (US); Giridhar Bhujanga, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 168 days.

(21) Appl. No.: 16/263,943

(22) Filed: Jan. 31, 2019

(65) Prior Publication Data

US 2020/0249986 A1  Aug. 6, 2020

(51) Int. Cl.
*G06F 9/48* (2006.01)
*G06F 9/50* (2006.01)
*G06F 9/455* (2018.01)

(52) U.S. Cl.
CPC ........ *G06F 9/4856* (2013.01); *G06F 9/45558* (2013.01); *G06F 9/5027* (2013.01); *G06F 2009/4557* (2013.01)

(58) Field of Classification Search
CPC .. G06F 9/4856; G06F 9/45558; G06F 9/5027; G06F 2009/4557
See application file for complete search history.

(56) References Cited

U.S. PATENT DOCUMENTS

| 8,352,608 | B1 * | 1/2013 | Keagy | G06F 8/63 |
| | | | | 709/226 |
| 2012/0195187 | A1 * | 8/2012 | Ashihara | H04L 49/25 |
| | | | | 370/220 |
| 2012/0233607 | A1 * | 9/2012 | Kuroda | G06F 9/5077 |
| | | | | 718/1 |
| 2013/0227127 | A1 * | 8/2013 | Takano | G06F 9/5077 |
| | | | | 709/224 |
| 2015/0082432 | A1 * | 3/2015 | Eaton | G06F 9/5072 |
| | | | | 726/23 |
| 2018/0341507 | A1 * | 11/2018 | Inbaraj | G06F 9/5088 |

* cited by examiner

*Primary Examiner* — Emerson C Puente
*Assistant Examiner* — Jonathan R Labud
(74) *Attorney, Agent, or Firm* — Duane Morris LLP; Manita Rawat

(57) ABSTRACT

This application relates to apparatus and methods for reallocating tasks among servers, such as cloud datacenter compute servers. A control server may identify hypervisors running virtual machines that are consuming higher processing power, and may reallocate one or more of the virtual machines to one or more hypervisors consuming lower processing power. In some examples, the control server reallocates virtual machines among hypervisors based on how many virtual machines each hypervisor is running. In some examples, the control server identifies virtual machines associated with higher processing steal times, and may reallocate the identified virtual machines to hypervisors that are consuming lower processing power. The virtual machines may be reallocated to a different hypervisor executing on a same server, to a different hypervisor executing on a different server in a same datacenter, or to a different hypervisor executing on a different server in a different datacenter.

19 Claims, 7 Drawing Sheets

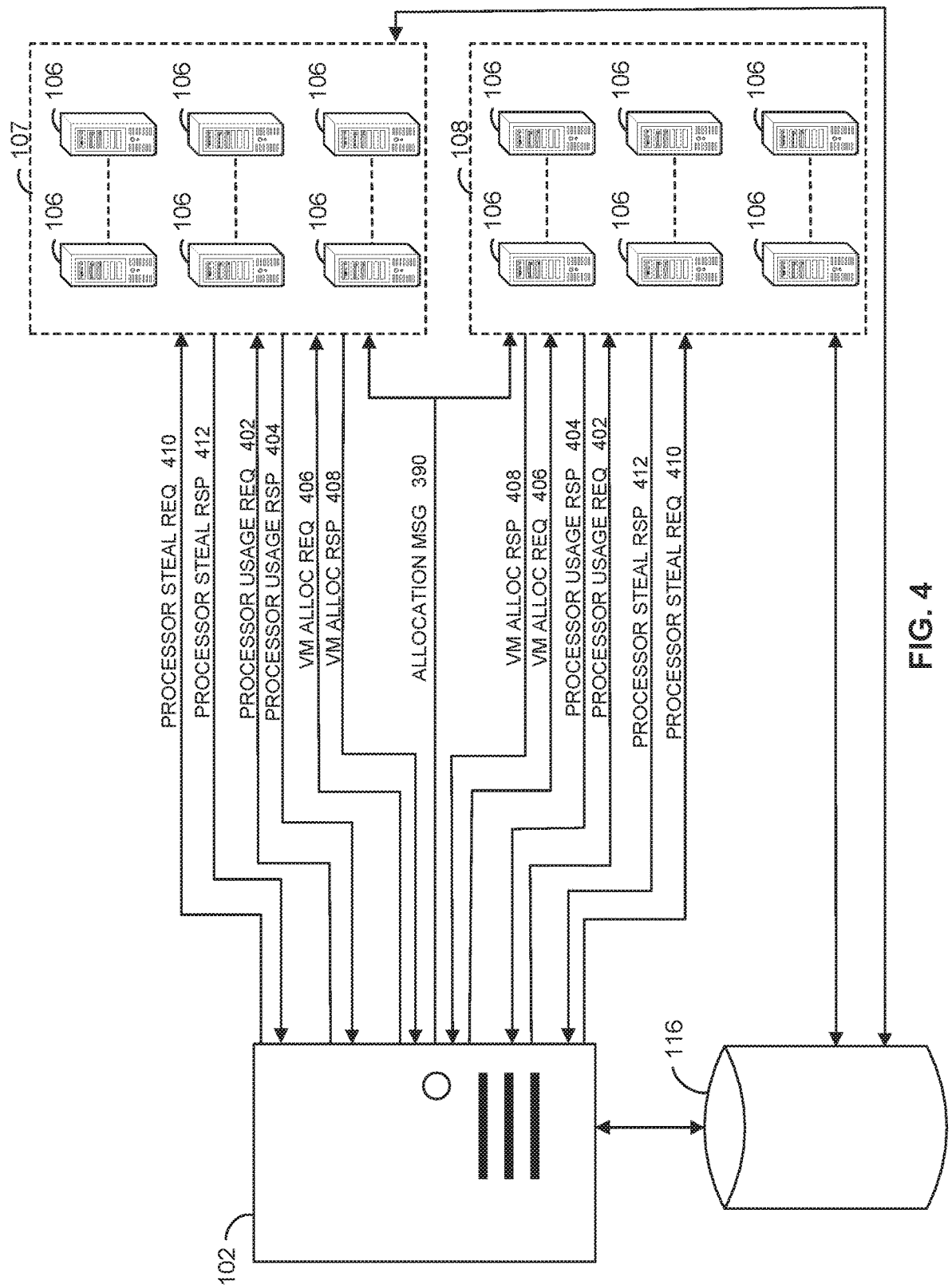

METHODS AND APPARATUS FOR VIRTUAL MACHINE REBALANCING

TECHNICAL FIELD

The disclosure relates generally to data systems that employ servers and, more specifically, to rebalancing processing tasks among the servers.

BACKGROUND

Some datacenters, such as cloud datacenters, may employ multiple servers to handle various data processing tasks. For example, a cloud datacenter may employ hundreds of compute servers to process large amounts of data. Datacenters may also include data storage capabilities, such as memory devices that allow for the storage of data, and networking resources that allow for communication among and with the servers. In some datacenter examples, servers may execute one or more hypervisors that run one or more virtual machines (VMs). To manage the datacenter including the various servers, some data systems employ software tools such as Openstack®.

Each server may include one or more processors to execute the hypervisors that run the VMs. The hypervisors and the VMs which they run may consume at least a portion of the processing power of the processors on which they execute. Sometimes, one or more processors may run hotter than others based on the processing tasks they are executing. For example, some processors may be executing processing tasks a larger percentage of time compared to others. This may happen, for example, because a hypervisor executing on one processor may be assigned more VMs than a hypervisor executing on another processor. The hypervisor running more VMs may consume more processing power than the hypervisor running less VMs. As such, there are opportunities to address the allocation of VMs to hypervisors in datacenters.

SUMMARY

The embodiments described herein are directed to rebalancing virtual machines (VMs) among hypervisors that execute on servers. The embodiments may allow for a reduction in "hot spots," or processors, such as central processing units (CPUs), or processing cores, that are running at a higher consumption rates than others. In some examples, the embodiments may allow hypervisors, executing on different processors or processing cores, to run a similar number or range of VMs. In some examples, the embodiments may allow for a reduction in VM processor steal data (e.g., CPU steal data), or the percentage of time a virtual machine (e.g., virtual processor) must wait for access to the real processor while a hypervisor is servicing another virtual machine.

In accordance with various embodiments, exemplary systems may be implemented in any suitable hardware or hardware and software, such as in any suitable computing device. For example, in some embodiments, a computing device is configured to transmit a request for hypervisor data to a first server of a plurality of servers, and receive the hypervisor data, in response to the request, identifying a first hypervisor executing on the first server of the plurality of servers, where the first hypervisor is allocated at least one virtual machine. The computing device may also be configured to determine, based on the received hypervisor data, that the first hypervisor is violating at least one hypervisor condition. The computing device may further be configured to determine, in response to determining that the first hypervisor is violating the at least one hypervisor condition, a second hypervisor, and to reallocate the at least one virtual machine from the first hypervisor to the second hypervisor.

In some embodiments, a method is provided that includes transmitting a request for hypervisor data to a first server of a plurality of servers and receiving the hypervisor data, in response to the request, where the hypervisor data identifies a first hypervisor executing on the first server of the plurality of servers, and where the first hypervisor is allocated at least one virtual machine. The method may also include determining, based on the received hypervisor data, that the first hypervisor is violating at least one hypervisor condition. The method may further include, in response to determining that the first hypervisor is violating the at least one hypervisor condition, determining a second hypervisor, and reallocating the at least one virtual machine from the first hypervisor to the second hypervisor.

In yet other embodiments, a non-transitory computer readable medium has instructions stored thereon, where the instructions, when executed by at least one processor, cause a computing device to perform operations that include transmitting a request for hypervisor data to a first server of a plurality of servers. The operations may also include receiving the hypervisor data, in response to the request, where the hypervisor data identifies a first hypervisor executing on the first server of the plurality of servers, and where the first hypervisor is allocated at least one virtual machine. The operations may also include determining, based on the received hypervisor data, that the first hypervisor is violating at least one hypervisor condition. The operations may further include, in response to determining that the first hypervisor is violating the at least one hypervisor condition, determining a second hypervisor, and reallocating the at least one virtual machine from the first hypervisor to the second hypervisor.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 4 is a block diagram illustrating examples of communications of the task allocation system of FIG. 1 in accordance with some embodiments;

DETAILED DESCRIPTION

Figure 1:
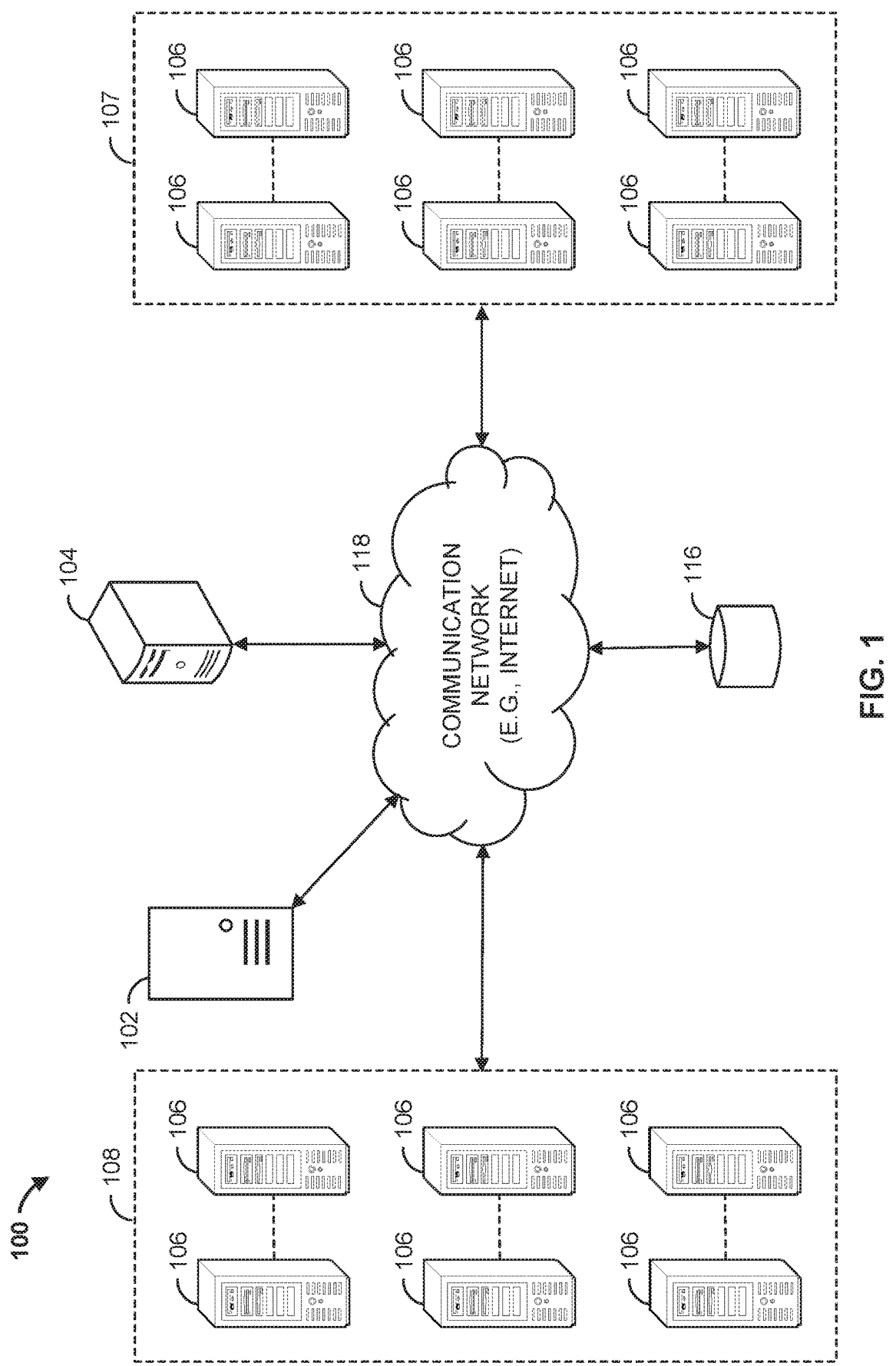
FIG. 1 is a block diagram of a task allocation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a task allocation system 100 that includes a control server 102, web server 104, database 116, and compute servers 106 communicatively coupled over network 118. Compute servers 106 may be part of a cloud datacenter 107, or cloud datacenter 108, for example. Control computing device 102, web server 104, and compute servers 106 can each be any suitable computing device that includes any hardware or hardware and software combination for processing and handling information. For example, any of control server 102, web server 104, and compute servers 106 can be a computer, a workstation, a laptop, a server such as a cloud-based server, a web server, a smartphone, or any other suitable device. In addition, each control server 102, web server 104, and compute servers 106 can transmit data to, and receive data from, communication network 118.

Each of control server 102, web server 104, and compute servers 106 can include one or more processors, one or more field-programmable gate arrays (FPGAs), one or more application-specific integrated circuits (ASICs), one or more state machines, digital circuitry, or any other suitable circuitry. Although FIG. 1 illustrates six computer servers 106 in each cloud datacenter 107, 108, task allocation system 100 can include any number of compute severs 106 in any number of cloud datacenters 107, 108. Similarly, task allocation system 100 can include any number of control servers 102, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Each of compute servers 106 may run one or more hypervisors that execute one or more virtual machines. Compute servers 106 may be operable to obtain one or more hypervisor images from, for example, non-volatile memory, and execute the hypervisor image to run the hypervisor. The hypervisor may execute among one or more processing cores of a processor, such as a CPU. In some examples, the hypervisor may execute among one or more processors of a compute server 106. Each hypervisor may support one or more virtual machines (VMs). For example, each hypervisor may be assigned one or more VMs to run. Each VM may be based on a virtual machine operating system, such as a Microsoft®, Linux®, Red Hat®, MacOS®, or any other VM operating system. Each hypervisor may run one or more of the same, or differing, VMs.

In some examples, web server 104 hosts one or more webpages, such as an online retailer's website. The website may allow customers to purchase items, such as goods or services, from the website. To support the website, web server 104 may communicate with one or more of compute servers 106. For example, web server 104 may send transaction data related to the purchase of items to one or more of compute servers 106. In some examples, one or more of compute servers 106 may support the website by providing item information, such as inventory or price information, to web server 104. In some examples, one or more of compute servers 106 provide configuration files to web server 104, to support one or more websites.

Database 116 can be any suitable non-volatile memory, such as a remote storage device, a cloud-based server, a memory device on another application server, a networked computer, or any other suitable non-transitory data storage device. In some examples, database 116 can be a local storage device, such as a hard drive, a non-volatile memory, or a USB stick. Database 116 may store one or more bootable images, such as a bootable image that may be executed by a hypervisor executing on a compute server 106. Database 116 may store, for example, virtual machine data. For example, database 116 may store one or more virtual machine images that, if run by a hypervisor, instantiate the virtual machine.

Control server 102 may be operable to control and manage compute servers 106 of cloud datacenter 107 and cloud datacenter 108. For example, control server 102 may employ software that facilitates for the control of compute servers 106, such as Openstack®. Control server 102 may be operable to transmit messages (e.g., commands, requests) to compute servers 106, and to receive messages (e.g., responses, status updates) from compute servers 106. In some examples, control server 102 may assign one or more VMs to a hypervisor that executes on a compute server 106. For example, control server 102 may assign a plurality of VMs to a first hypervisor executing on a compute server 106, and assign a second plurality of VMs to a second hypervisor executing on the same compute server 106. In some examples, control server 102 may assign a plurality of VMs to a first hypervisor executing on a first compute server 106, and assign a second plurality of VMs to a second hypervisor executing on a second, and different, compute server 106. The second compute server 106 may reside within a same, or differencing, cloud datacenter 106, 107 as first compute server 106.

In some examples, control server 102 may obtain hypervisor data, such as processor usage data, allocation data, or processor steal data, from each compute server 106. For example, control server 102 may receive processor usage data for each compute server 106, where the processor usage data may identify processor consumption for one or more processors. Processor steal data may identify, for example, processor steal times for one or more VMs of a hypervisor executing on a compute server 106. Allocation data may identify, for example, how many VMs are currently running on a hypervisor.

In some examples, control server 102 scans hypervisors to find VMs that may be consuming a threshold amount of the processing power of one or more processors (e.g., processor usage rate, CPU consumption, CPU utilization). The threshold amount of processing power may be, for example, a fixed threshold such as a percentage (e.g., 75% utilization). In some examples, the threshold amount of processing power may be a relative amount compared to the processing utilization of other compute server 106 processors (e.g., 50% of the average utilization of all processors in a cloud datacenter). If control server 102 identifies a VM consuming processing power over the threshold, control server 102 may reallocate the VM to a different hypervisor. For example, control server 102 may reallocate the VM to a hypervisor consuming processing power below a threshold. The different hypervisor may be in a same, or different, cloud datacenter. The reallocation of the VM may be, for example, a live migration of the VM from one hypervisor to another.

In some examples, control server 102 may reallocate the VM to the hypervisor with the lowest processing power consumption. The processing consumption of a hypervisor may include, for example, the processing consumption of one or more processors executing all VMs running on that hypervisor, as well as hypervisor processing power required for control or management of those VMs.

In some examples, control server 102 identifies hypervisors that are running more than a maximum number of VMs. For example, control server 102 may identify hypervisors that are running more than 3 VMs. For any hypervisor that is running more than the maximum number of VMs, control server 102 may reallocate one or more of the VMs for that hypervisor to a second hypervisor. The second hypervisor may be running less than the maximum number of VMs, for example. In some examples, control server 102 will assign the second hypervisor additional VMs as long as the total number of VMs on the second hypervisor does not exceed the maximum number of VMs. In some examples, control server 102 may reallocate a plurality of VMs from one hypervisor, to multiple hypervisors. The hypervisors being assigned the VMs may reside in a same, or different, cloud datacenter. In some examples, each cloud datacenter is associated with its own maximum number of VMs per hypervisor. For example, cloud datacenter 107 may allow up to three VMs per hypervisor, while cloud datacenter 108 may allow up to five VMs per hypervisor.

In some examples, control server 102 determines processor steal data (e.g., rates, times) for VMs of hypervisors executing on processors of compute servers 106. Control server 102 may identify, for example, VMs with processor steal rates over a maximum threshold, such as 50%. Control server 102 may then reallocate the identified VMs to hypervisors associated with low processor consumption (e.g., hypervisors executing on processors with processing consumption below a threshold). For example, control server 102 may reallocate a VM running on a hypervisor of a first compute server 106 that has a processing steal data greater than a maximum threshold, to a hypervisor of a second compute server 106 that is consuming processing power below a minimum threshold. In some examples, the second compute server 106 is from a same datacenter 107, 108 than the first compute server 106. In some examples, the second compute server 106 is from a different datacenter 107, 108 than the first compute server 106.

In some examples, control server 102 reallocates one or more VMs of a hypervisor of the first compute server 106 to a second hypervisor based on processing steal data for VMs of the second hypervisor. For example, control server 102 may determine an average processing steal data for each hypervisor of one or more compute servers 106, where the average processing steal data is based on the processing steal data for all VMs executing on that hypervisor. Control server 102 may reallocate a VM with a processing steal data greater than a maximum threshold to a hypervisor associated with the lowest average processing steal data.

Figure 2:
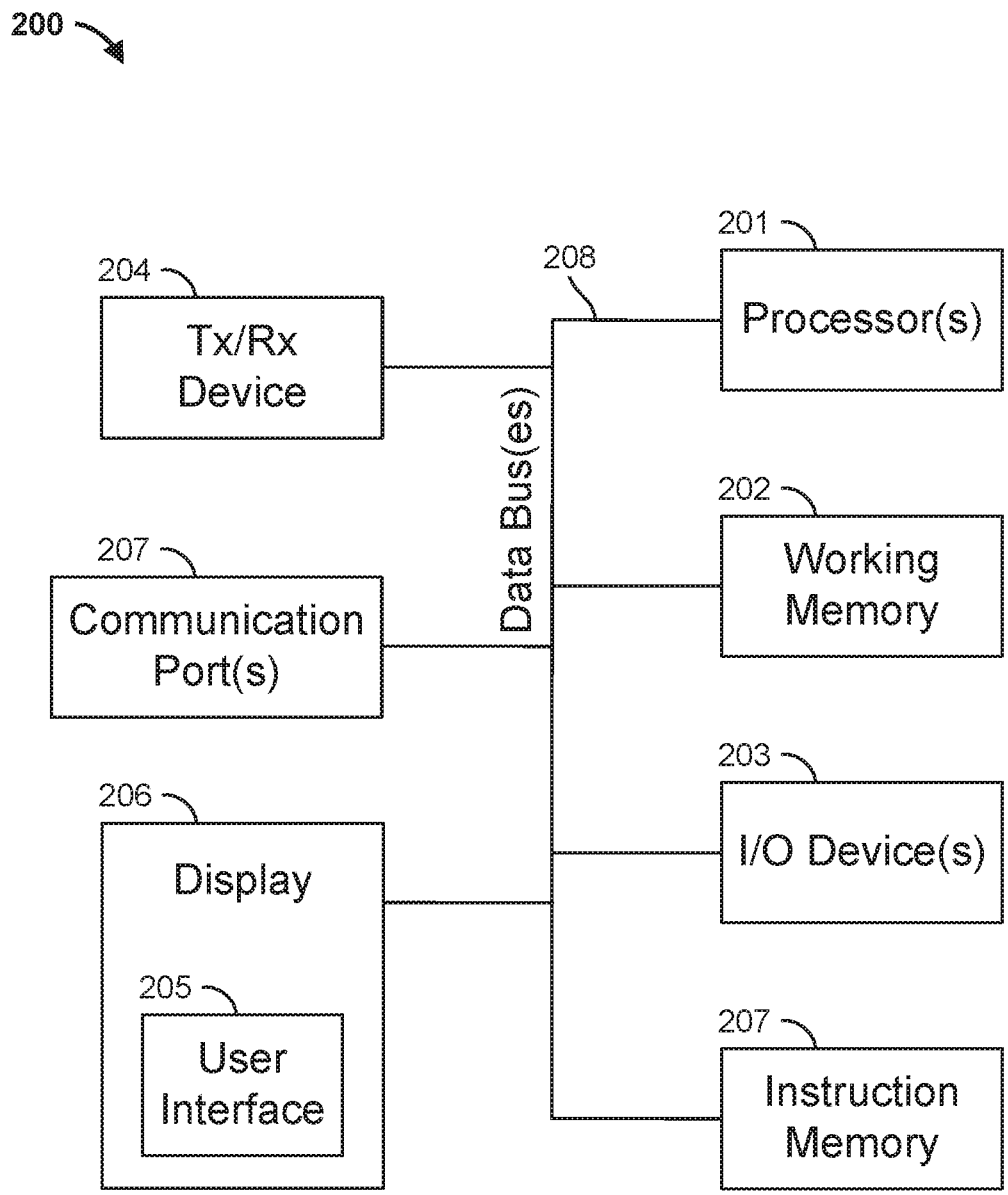
FIG. 2 is a block diagram of the example control server of the task allocation system of FIG. 1 in accordance with some embodiments.

FIG. 2 illustrates the control server 102 of FIG. 1. Control server 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of control server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as hypervisor and VM configuration files.

Display 206 can display user interface 205. User interfaces 205 can enable user interaction with control server 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 control server 102 will be operating in. Processor(s) 201 is operable to receive data from, or send data to, a network, such as communication network 118 of FIG. 1, via transceiver 204.

Figure 3A:
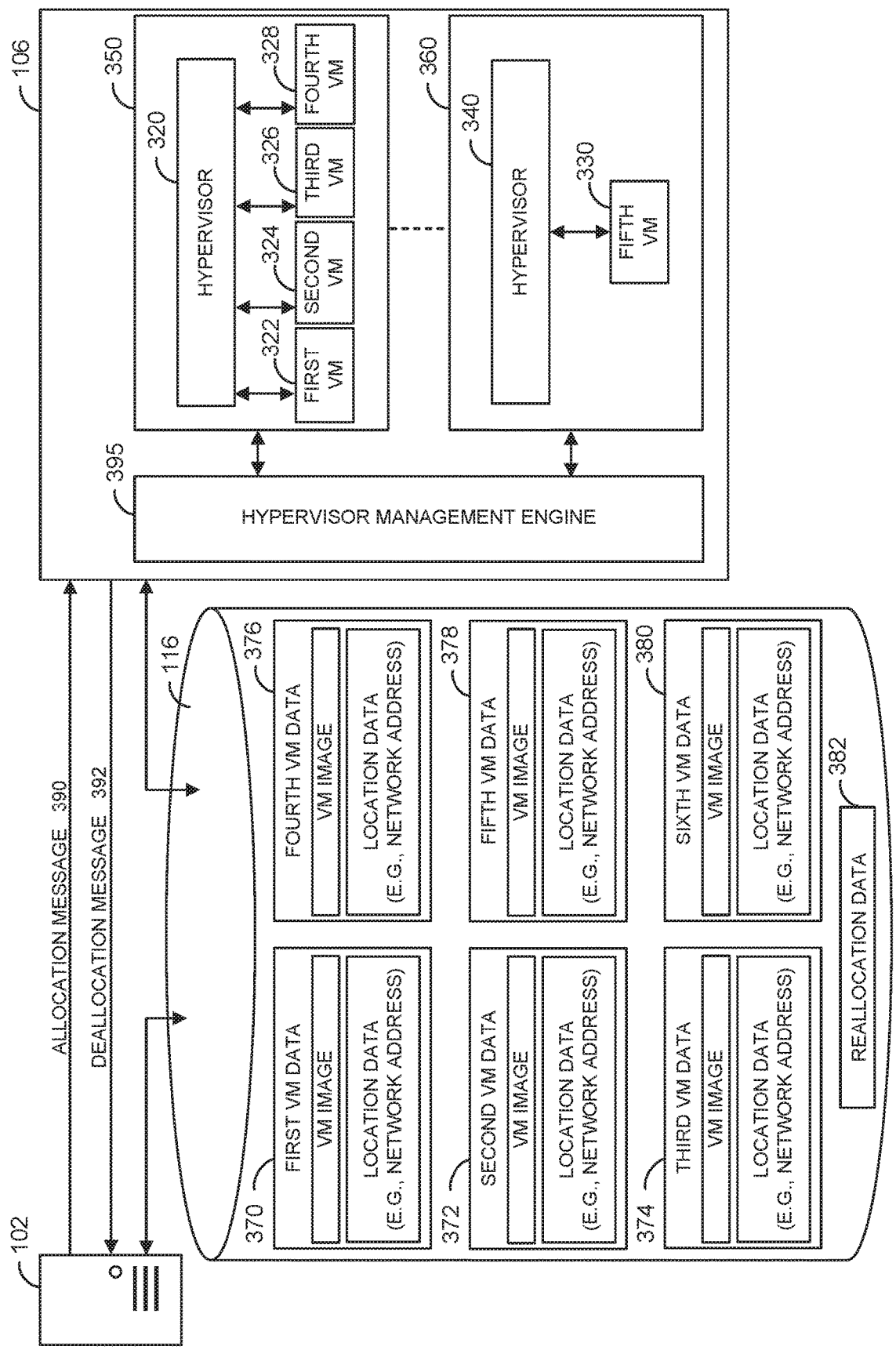
FIGS. 3A and 3B are block diagrams illustrating examples of various portions of the task allocation system of FIG. 1 in accordance with some embodiments.
Figure 3B:
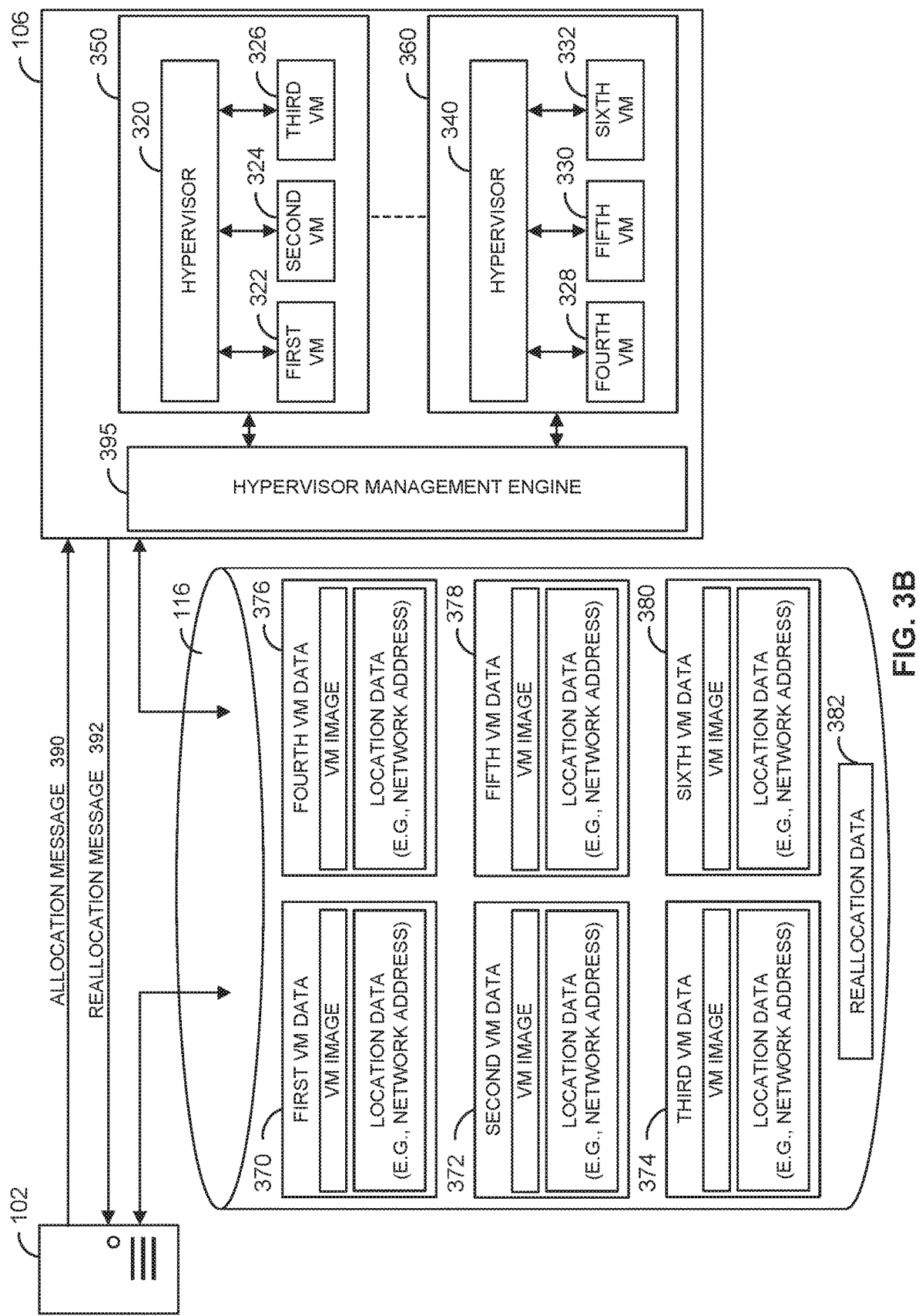

FIGS. 3A and 3B are block diagrams illustrating examples of various portions of the task allocation system 100 of FIG. 1. As indicated in FIG. 3A, control server 102 is communicatively coupled to database 116 and compute server 106. For example, control server 102 may communicate with database 116 and compute server 106 over network 118. As illustrated, compute server 106 includes first processor 350 and second processor 360. Although two processors are shown, compute server 106 may include any number of processors. In addition, each of first processor 350 and second processor 360 may include any number of processing cores (not shown).

Each of first processor 350 and second processor 360 may execute one or more processing tasks. In this example, first processor 350 executes first hypervisor 320, which may run one or more virtual machines (VMs). As illustrated, first hypervisor 320 has installed, and may run, first VM 322, second VM 324, third VM 326, and fourth VM 328. Second processor executes second hypervisor 360, which also may run one or more VMs. As illustrated, second hypervisor 360 has installed, and may run, fifth VM 330.

Control server 102 also includes hypervisor management engine 395, which may be operable to manage and control hypervisors executing on first processor 350 and second processor 360. For example, hypervisor management engine 395 may assign, and cause the installation of, one or more VMs to first hypervisor 320 and second hypervisor 340. Hypervisor management engine 395 may also cause the uninstallation (e.g., deletion) of one or more VMs installed on first hypervisor 320 and second hypervisor 340. Hypervisor management engine 395 may be implemented as an executable program maintained in a tangible, non-transitory memory, that may be executed by one or processors, such as a control processor (e.g., CPU).

Control server 102 is operable to allocate (e.g., assign) one or more VMs to each of first hypervisor 320 and second hypervisor 360. For example, database 116 may store VM image data corresponding to one or more VMs. Each VM may be based on a same, or different, virtual machine operating system, such as Microsoft®, Linux®, Red Hat®, MacOS®, or any other VM operating system.

VM image data may include a VM image, which may be an executable image that, if executed by a processor, causes the processor to execute the VM, and location data, which may identify a current network location (e.g., network address) of the VM. For example, as illustrated, database 116 is storing first VM data 370, second VM data 372, third VM data 374, fourth VM data 376, fifth VM data 378, and sixth VM data 380. Each of first VM data 370, second VM data 372, third VM data 374, fourth VM data 376, fifth VM data 378, and sixth VM data 380 include a corresponding VM image, and location data.

In this example, control server 102 allocates first VM 322, corresponding to first VM data 370, to hypervisor 320, which is executing on first processor 350. For example, control server 102 may transmit an allocation message 390 to compute server 106, where allocation message 390 identifies an assignment of the VM corresponding to first VM data 370, stored in database 116, to hypervisor 320.

Control server 102 also allocates to hypervisor 320 second VM 324 corresponding to second VM data 372, third VM 326 corresponding to third VM data 374, and fourth VM 342 corresponding to fourth VM data 376 to hypervisor 320. For example, control server 102 may transmit to control server 102 an allocation message 390 identifying the assignment of the VMs corresponding to first VM data 370, second VM data 372, third VM data 374, and fourth VM data 376 to hypervisor 320.

Hypervisor management engine 395 may parse allocation message 390 to determine the assignments, and may cause computer server 106 to obtain, from database 116, one or more VM images corresponding to the one or more assigned VMs. In this example, computer server 106 obtains, from database 116, VM images corresponding to first VM data 370, second VM data 372, third VM data 374, and fourth VM data 376. Hypervisor management engine 395 may then cause hypervisor 320 to install and execute the obtained VM images.

In this example, hypervisor management engine 395 causes hypervisor 320 to install and execute the obtained VM image corresponding to first VM data 370 to run first VM 322. Similarly, hypervisor 320 may install and execute the obtained VM image corresponding to second VM data 372 to run second VM 324. Hypervisor management engine 395 may also cause hypervisor 320 to install and execute the obtained VM image corresponding to third VM data 374 to run third VM 326, and may install and execute the obtained VM image corresponding to fourth VM data 376 to run fourth VM 328.

Hypervisor management engine 395 may store in memory the assignment of VMs to hypervisors. In this example, hypervisor management engine 395 may store data in memory identifying and characterizing the assignment of first VM 322, second VM 324, third VM 326, and fourth VM 328 to hypervisor 320. Similarly, hypervisor management engine 395 may store data in memory identifying and characterizing the assignment of fifth VM 330 to hypervisor 340.

In some examples, hypervisor management engine 395 assigns a network address to each VM. For example, hypervisor management engine 395 may assign a network address to each VM that may be reached via network 118. The assigned network addresses may be different from each other. For example, hypervisor management engine 395 may assign a first network address to first VM 322, a second network address to second VM 324, a third network address to third VM 326, a fourth network address to fourth VM 328, and a fifth network address to fifth VM 330.

In some examples, hypervisor management engine 395 may store the network address in database 116. For example, hypervisor management engine 395 may store the network address for each VM as location data within VM image data for the corresponding VM. For example, hypervisor management engine 395 may store the first network address to the first VM 322 in location data for first VM data 370. Similarly, hypervisor management engine 395 may store the second network address to the second VM 324 in location data for second VM data 372, the third network address to the third VM 326 in location data for third VM data 374, the fourth network address to the fourth VM 328 in location data for fourth VM data 378, and the fifth network address to the fifth VM 330 in location data for fifth VM data 378.

Control server 102 may also reallocate VMs from one hypervisor to another hypervisor. Referring to FIG. 3B, control server 102 reallocates fourth VM 328 from hypervisor 320, which is executing on first processor 350, to hypervisor 340, which is executing on second processor 360. Although in this example fourth VM 328 is reallocated from first processor 350 of compute server 106 to second processor 360 of compute server 106, in other examples, control server 102 may allocate a VM from a hypervisor executing on one compute server 106 to a hypervisor executing on a different compute server 106, such as a compute server 106 within a different cloud datacenter.

Control server 102 may reallocate a VM, such as fourth VM 328, by transmitting a deallocation message 392 to compute server 106 identifying the deallocation of a VM from a hypervisor. For example, to deallocate fourth VM 328 from hypervisor 320, control server 102 may transmit a deallocation message 392 to compute server 106 identifying the deallocation of fourth VM 328. Hypervisor management engine 395 may parse deallocation message 392 to determine the deallocation, and may cause first hypervisor 320 to uninstall fourth VM 328.

In some examples, hypervisor management engine 395 obtains, from the hypervisor a VM is being deallocated from, data identifying and characterizing one or more applications being executed by the VM. For example, the data may include configuration information, application data, session data, or any other data related to any processing task being run by the VM. Hypervisor management engine 395 may then cause compute server 106 to store the data as reallocation data 382 in database 116. Hypervisor management engine 395 may also transmit a reallocation data message 394 to control server 102 identifying reallocation data 382.

Control server 102 may also transmit an allocation message 390 identifying an assignment of the VM corresponding to fourth VM data 376 to second hypervisor 340. Upon receiving allocation message 390, hypervisor management engine 395 may cause compute server 106 to obtain, from database 116, the VM image corresponding to fourth VM data 376. Upon obtaining the VM image, hypervisor management engine 395 may cause hypervisor 340 to install and execute the obtained VM image corresponding to fourth VM data 376 to run fourth VM 328.

In some examples, control server may also identify, in the allocation message 390, reallocation data 382 associated with processing tasks being run by the deallocated VM. For example, in response to a deallocation message 392 for deallocating fourth VM 328, hypervisor management engine 395 may have transmitted a reallocation data message 394 to control server 102 identifying reallocation data 382 for processing task being run by fourth VM 328 prior to deallocation. Control server 102 may identify the reallocation data 382 for the fourth VM 328 in an allocation message 390 allocating fourth VM 328 to hypervisor 340.

In some examples, control server 102 may message a deallocation of a VM, as well as an allocation of the same or different VM, in a same allocation message 395. For example, allocation message 390 may include a deallocation message 392. In some examples, allocation message 395 may include a reallocation of a VM (e.g., deallocation and an allocation of the VM), as well as an allocation of a different VM. For example, allocation message 395 may identify the deallocation of fourth VM 328 from hypervisor 320, the allocation of fourth VM 328 to hypervisor 340, and the allocation of sixth VM 332 (corresponding to sixth VM data 380 stored in database 116) to hypervisor 340.

FIG. 4 is a block diagram illustrating examples of communications of the task allocation system 100 of FIG. 1. In this example, each of cloud datacenter 107 and cloud datacenter 108 include at least two compute servers 106. Control server 102 is communicatively coupled to each computer server 106 of each of cloud datacenter 107 and cloud datacenter 108.

Control server 102 may be operable to scan hypervisors, such as first hypervisor 320 and second hypervisor 340, to identify VMs, such as first VM 322, consuming a threshold amount of processing power (e.g., processor usage rate, CPU consumption). For example, control server 102 may generate and transmit a processor usage request 402 to compute servers 106 in cloud datacenter 107 and cloud datacenter 108. The processor usage request 402 includes a request for the processing power being utilized by each VM being run by each hypervisor.

In response to processor usage request 402, each compute server 106 may determine an amount of processing power being utilized by each VM being run by each hypervisor. For example, hypervisor management engine 395 may query each hypervisor to determine the processing power being utilized by each installed VM. Compute server 106 may then report the VM processing power to control server 102 by generating and transmitting a processor usage response 404 that includes the VM processing power data. Based on the obtained processing power data for each VM, control server 102 may reallocate a VM from one hypervisor to another hypervisor.

Control server 102 may also be operable to scan hypervisors, such as first hypervisor 320 and second hypervisor 340, to determine a number of VMs being run by each hypervisor. For example, control server 102 may generate and transmit a VM allocation request 406 to compute servers 106 in cloud datacenter 107 and cloud datacenter 108. The VM allocation request 406 includes a request for the number of VMs being run by each hypervisor.

In response to the VM allocation request 406, each compute server 106 may determine the number of VMs being run by each hypervisor. For example, hypervisor management engine 395 may query each hypervisor to determine the number of VMs being run. In some examples, rather than querying the hypervisors, hypervisor management engine 395 has the information stored in memory. Compute server 106 may then report the number of VMs for each hypervisor to control server 102 by generating and transmitting a VM allocation response 408 that identifies each hypervisor and a corresponding number of VMs allocated to each hypervisor. Based on the obtained number of VMs run for a particular hypervisor, control server 102 may reallocate a VM from one hypervisor to another hypervisor. For example, control server 102 may reallocate a VM from a hypervisor with a number of VMs above a maximum threshold to a hypervisor with a number of VMs below a minimum threshold.

Control server 102 may also be operable to scan hypervisors, such as first hypervisor 320 and second hypervisor 340, to determine processor steal data for each VM being run by each hypervisor. For example, control server 102 may generate and transmit a processor steal request 410 to compute servers 106 in cloud datacenter 107 and cloud datacenter 108. The processor steal request includes a request for processor steal data for each VM being run by each hypervisor.

In response to processor steal request 410, each compute server 106 may determine processor steal data for each VM being run by each hypervisor. For example, hypervisor management engine 395 may query each hypervisor to determine processor steal data for each installed VM. Compute server 106 may then report the processor steal data to control server 102 by generating and transmitting a processor steal response 412 that includes the processor steal data for VMs being run by each hypervisor. Based on the obtained processor steal data for each VM, control server 102 may reallocate a VM from one hypervisor to another hypervisor. For example, control server 102 may reallocate a VM with relatively higher processing steal rates from its hypervisor to a hypervisor with VMs indicating lower processing steal rates. Or, as another example, control server 102 may reallocate a VM with relatively higher processing steal rates from its hypervisor to a hypervisor running one or more VMs with relatively lower processing power consumptions.

Figure 5:
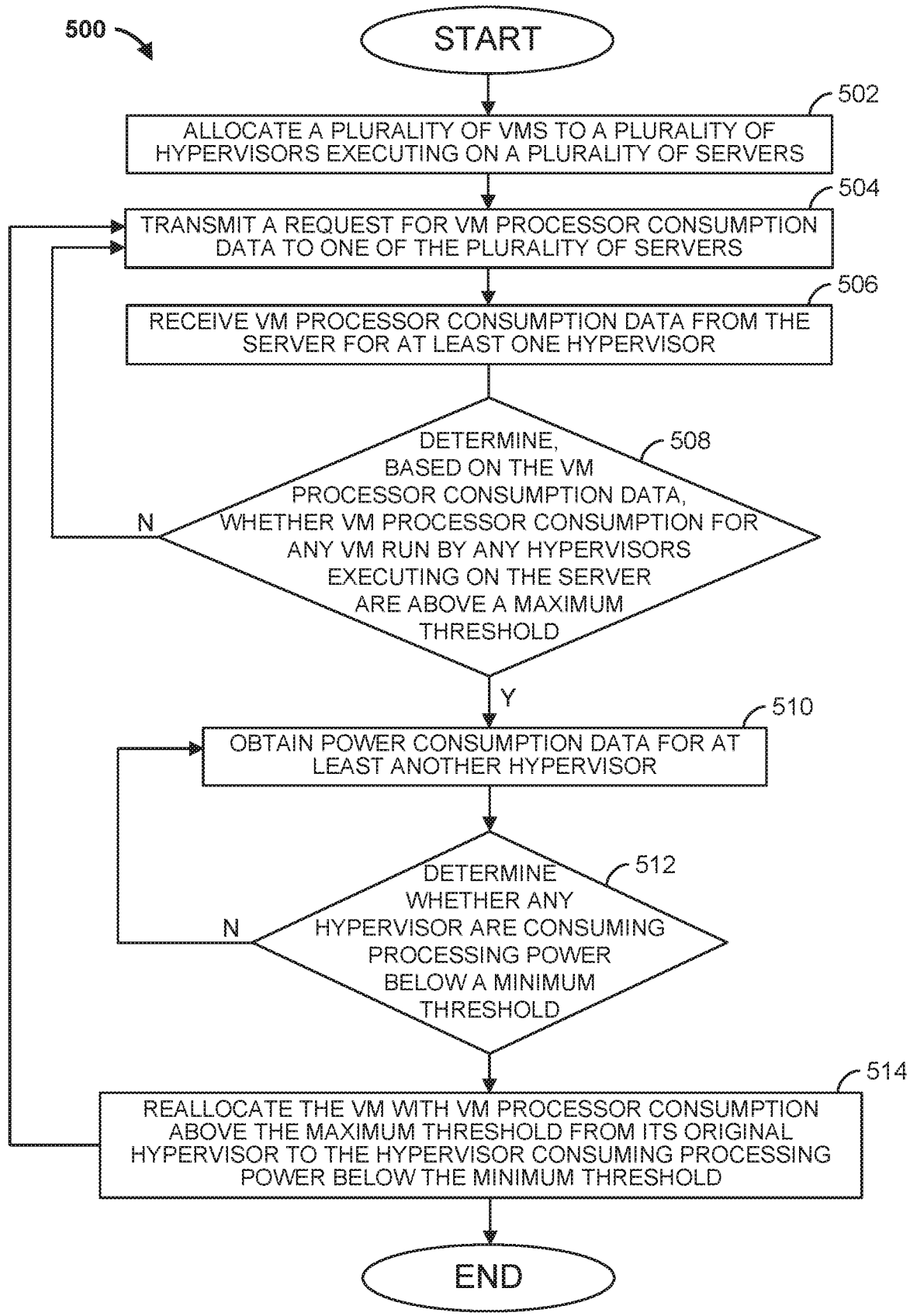
FIG. 5 is a flowchart of an example method that can be carried out by the control server of FIG. 1 in accordance with some embodiments.

FIG. 5 is a flowchart of an example method 500 that can be carried out by a computing device, such as the control server 102 of FIG. 1. Beginning at step 502, a plurality of virtual machines (VMs) are allocated to a plurality of hypervisors executing on a plurality of servers. For example, control server 102 may allocate VMs to the plurality of servers by generating and transmitting allocation messages 390 to compute servers 106 in cloud datacenter 107 and cloud datacenter 108. At step 504, a request for VM processor consumption data is transmitted to a server of the plurality of servers. For example, control server 102 may generate and transmit a processor usage request 402 to a compute server 106 in cloud datacenter 107 or cloud datacenter 108, where the processor usage request 402 includes a request for the processing power being utilized by each VM being run by each hypervisor executing on any of computer server's 106 processors. At step 506, VM processor consumption data for the server is obtained. For example, compute server 102 may receive a processor usage response 404 from the compute server 106 indicating processor consumption for one or more VMs.

Proceeding to step 508, a determination is made, based on the received processor consumption data, as to whether any VM run by any hypervisors executing on the server are above a maximum threshold. For example, control server 102 may compare processor consumption data for each VM to the maximum threshold. If no VMs are consuming processing power about the maximum threshold, the method proceeds back to step 504 to transmit a request for VM processor consumption data to another server of the plurality of servers. Otherwise, the method proceeds to step 510, where a power consumption data is obtained for at least another hypervisor. For example, control server 102 may generate and transmit another processor usage request 402 to a different compute server 106 in cloud datacenter 107 or cloud datacenter 108, and receive, via a processor usage response 404, processing power being utilized by each VM being run by each hypervisor executing on any of that computer server's 106 processors.

Proceeding to step 512, a determination is made as to whether any of the hypervisors are consuming processing power below a minimum threshold. For example, control server 102 may determine an average VM processing power consumption for the VMs running on each of the hypervisors, and compare the average VM processing power consumption to the minimum threshold. If none of the hypervisors are consuming processing power below the minimum threshold, the method proceeds back to step 510 where power consumption data is obtained for at least another hypervisor. Otherwise, if at least one of the hypervisors are consuming processing power at or above the minimum threshold, the method proceeds to step 514.

At step 514, the VM determined at step 508 to be consuming processing power above the threshold is reallocated from its hypervisor to the hypervisor determined at step 512 to be consuming processing power below the minimum threshold. For example, control server 102 may generate and transmit a deallocation message 394 to the former hypervisor to deallocate the VM, and transmit an allocation message 392 to the later hypervisor to allocate the VM. The method may then proceed back to step 504, or may end.

Figure 6:
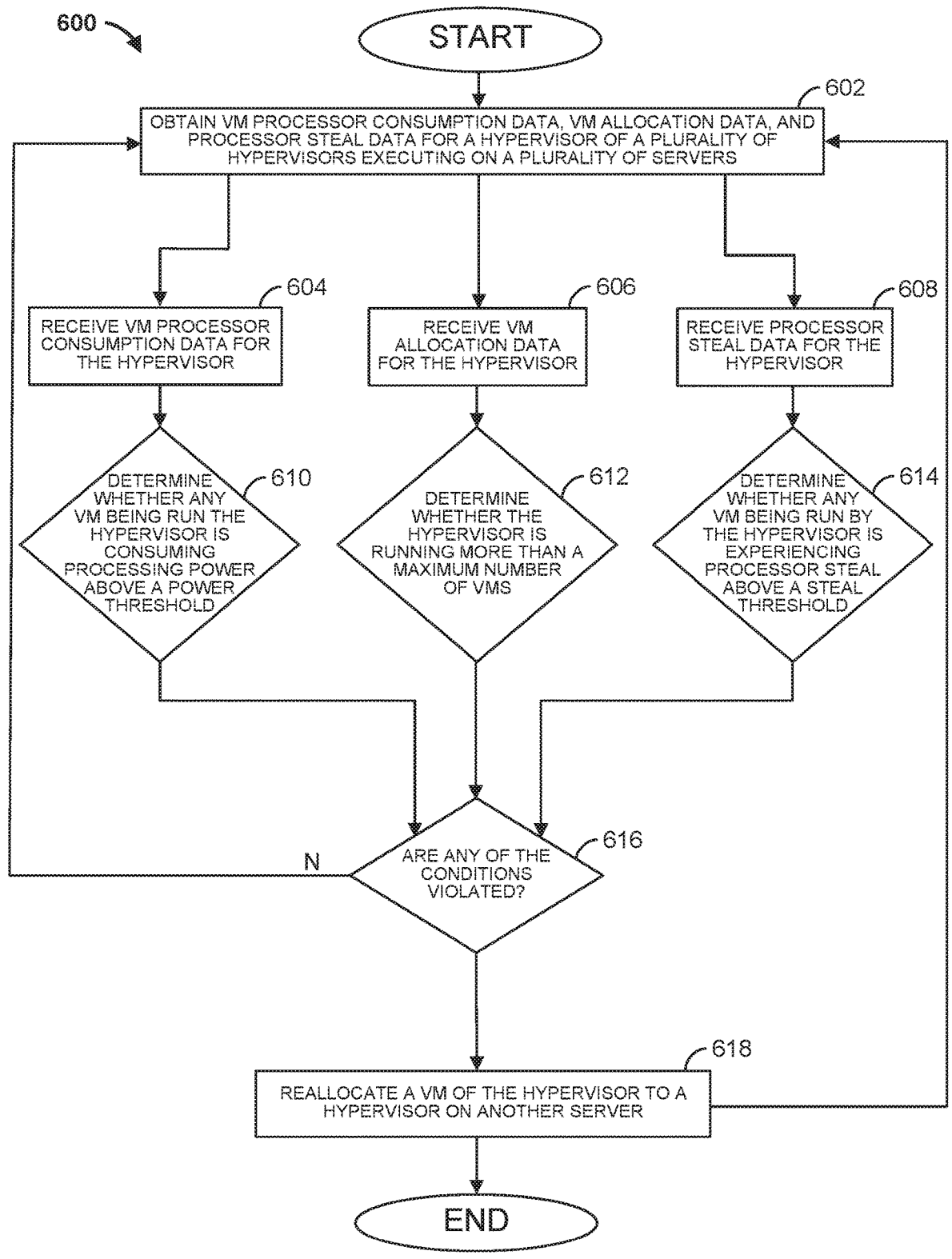
FIG. 6 is a flowchart of another example method that can be carried out by the control server of FIG. 1 in accordance with some embodiments.

FIG. 6 is a flowchart of an example method 600 that can be carried out by a computing device, such as the control server 102 of FIG. 1. At step 602, the computing device obtains VM processor consumption data, VM allocation data, and processor steal data for a hypervisor of a plurality of hypervisors executing on a plurality of servers. The VM processor consumption data may identify an amount of processor consumption for at least one VM run by the hypervisor. The VM allocation data may identify a number of VMs being run by the hypervisor. The processor steal data may identify processor steal time for at least one VM being run by the hypervisor. At step 604, the VM processor consumption data for the hypervisor is received. At step 606, the VM allocation data for the hypervisor is received. And at step 608, the processor steal data for the hypervisor is received.

For example, control server 102 may obtain VM processor consumption data by transmitting a processor usage request 402 to a compute server 106, and in response receive the VM processor consumption data in a processor usage response 404. Control server 102 may also obtain VM allocation data by transmitting a VM allocation request 406 to the compute server 106, and in response receive the VM allocation data in a VM allocation response 408. Control server 102 may also obtain processor steal data by transmitting a processor steal request 410 to the compute server 106, and in response receive the processor steal data in a processor steal response 412.

Proceeding from step 604 to step 610, a determination is made, based on the received VM processor consumption data, as to whether any VM being run by the hypervisor is consuming processing power above a power threshold. For example, control server 102 may compare the power consumption for each VM received in the processor consumption data to the power threshold, which may be stored in memory. The result of the determination (e.g., a determination as to whether the power threshold condition was violated), is provided to and analyzed at step 616.

At step 612, which proceeds from step 606, a determination is made, based on the received VM allocation data, as to whether the hypervisor is running more than a maximum number of VMs. For example, control server 102 may compare the number of VMs being run by the hypervisor received in the VM allocation data to the maximum number of VMs, which may be stored in memory. The result of the determination (e.g., a determination as to whether the maximum number of VMs condition was violated), is provided to and analyzed at step 616.

At step 614, which proceeds from step 608, a determination is made, based on the received processor steal data, as to whether any VM being run by the hypervisor is experiencing processor steal about a steal threshold. For example, control server 102 may compare the power steal time for each VM received in the processor consumption data to the steal threshold, which may be stored in memory. The result of the determination (e.g., a determination as to whether the steal threshold condition was violated), is provided to and analyzed at step 616.

At step 616, a determination is made as to whether any of the conditions (e.g., hypervisor conditions) in steps 610, 612, or 614 are violated. If any conditions were violated, the method proceeds back to step 602, where VM processor consumption data, VM allocation data, and processor steal data is obtained for another hypervisor of the plurality of hypervisors. Otherwise, if none of the conditions were violated, the method proceeds to step 618, where a VM of the hypervisor is reallocated to a hypervisor on another server. For example, control server 102 may reallocate the VM by transmitting a deallocation message 392 identifying the VM to the compute server 106 executing the hypervisor the VM is currently assigned to, and transmitting an allocation message 390 identifying the VM to the compute server 106 executing the hypervisor to which the VM is to be reallocated.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
transmit a request for hypervisor data to a first server of a plurality of servers;
receive the hypervisor data, in response to the request, identifying a first hypervisor executing on the first server of the plurality of servers, wherein the first hypervisor is allocated at least one virtual machine;
determine, based on the received hypervisor data, that the first hypervisor is violating at least one hypervisor condition; and in response to determining that the first hypervisor is violating the at least one hypervisor condition:
transmit a request for additional hypervisor data to the plurality of servers;
receive the additional hypervisor data from at least one of the plurality of servers; and
determine, based on the additional hypervisor data, a second hypervisor that is not satisfying at least a second hypervisor condition;
wherein determining, based on the additional hypervisor data, the second hypervisor that is not satisfying at least the second hypervisor condition comprises:
determining a virtual machine processing power consumption for each of a plurality of hypervisors based on virtual machines running on each of the plurality hypervisors;
comparing the virtual machine processing power consumption for each of the plurality of hypervisors to a minimum threshold; and
determining the second hypervisor out of the plurality of hypervisors based on the comparisons; and
transmit an allocation message to reallocate the at least one virtual machine from the first hypervisor to the second hypervisor, wherein the allocation message identifies a processing task of the at least one virtual machine.

2. The system of claim 1, wherein the hypervisor data identifies processor consumption for the at least one virtual machine, and wherein the computing device is configured to:
determine whether the processor consumption is beyond a threshold; and
determine that the first hypervisor is violating the at least one hypervisor condition when the processor consumption is beyond the threshold.

3. The system of claim 1, wherein the hypervisor data identifies processor steal for the at least one virtual machine, and wherein the computing device is configured to:
determine whether the processor steal is beyond a threshold; and
determine that the first hypervisor is violating the at least one hypervisor condition when the processor steal is beyond the threshold.

4. The system of claim 1, wherein the hypervisor data identifies a number of virtual machines allocated to the first hypervisor, and wherein the computing device is configured to:
determine whether the number of virtual machines allocated to the first hypervisor is beyond a threshold; and
determine that the first hypervisor is violating the at least one hypervisor condition when the number of virtual machines is beyond the threshold.

5. The system of claim 1, wherein the computing device is configured to:
transmit a deallocation message to the first server of the plurality of servers to deallocate the at least one virtual machine from the first hypervisor; and
transmitting the allocation message to a second server of the plurality of servers to allocate the at least one virtual machine to the second hypervisor.

6. The system of claim 1, wherein the computing device is configured to reallocate the at least one virtual machine from the first hypervisor to the second hypervisor executing on a second server of the plurality of servers.

7. The system of claim 1 wherein determining the second hypervisor comprises determining that the second hypervisor does not violate the at least one hypervisor condition.

8. The system of claim 1, wherein the computing device is configured to allocate a plurality of virtual machines to the plurality of servers.

9. A method comprising:
transmitting a request for hypervisor data to a first server of a plurality of servers;
receiving the hypervisor data, in response to the request, identifying a first hypervisor executing on the first server of the plurality of servers, wherein the first hypervisor is allocated at least one virtual machine;
determining, based on the received hypervisor data, that the first hypervisor is violating at least one hypervisor condition; and
in response to determining that the first hypervisor is violating the at least one hypervisor condition:
transmitting a request for additional hypervisor data to the plurality of servers;
receiving the additional hypervisor data from at least one of the plurality of servers; and
determining, based on the additional hypervisor data, a second hypervisor that is not satisfying at least a second hypervisor condition;
wherein determining, based on the additional hypervisor data, the second hypervisor that is not satisfying at least the second hypervisor condition comprises:
determining a virtual machine processing power consumption for each of a plurality of hypervisors based on virtual machines running on each of the plurality hypervisors;
comparing the virtual machine processing power consumption for each of the plurality of hypervisors to a minimum threshold; and
determining the second hypervisor out of the plurality of hypervisors based on the comparisons; and
transmitting an allocation message to reallocate the at least one virtual machine from the first hypervisor to the second hypervisor, wherein the allocation message identifies a processing task of the at least one virtual machine.

10. The method of claim 9 further comprising:
determining that the hypervisor data identifies processor consumption for the at least one virtual machine;
determining whether the processor consumption is beyond a threshold; and
determining that the first hypervisor is violating the at least one hypervisor condition when the processor consumption is beyond the threshold.

11. The method of claim 9 further comprising:
determining that the hypervisor data identifies processor steal for the at least one virtual machine;
determining whether the processor consumption is beyond a threshold; and
determining that the first hypervisor is violating the at least one hypervisor condition when the processor consumption is beyond the threshold.

12. The method of claim 9 further comprising:
determining that the hypervisor data identifies a number of virtual machines allocated to the first hypervisor;
determining whether the number of virtual machines allocated to the first hypervisor is beyond a threshold; and
determining that the first hypervisor is violating the at least one hypervisor condition when the number of virtual machines is beyond the threshold.

13. The method of claim 9 comprising:
transmitting a deallocation message to the first server of the plurality of servers to deallocate the at least one virtual machine from the first hypervisor; and
transmitting the allocation message to a second server of the plurality of servers to allocate the at least one virtual machine to the second hypervisor.

14. The method of claim 9 wherein determining the second hypervisor comprises determining that the second hypervisor does not violate the at least one hypervisor condition.

15. A non-transitory computer readable medium having instructions stored thereon, wherein the instructions, when executed by at least one processor, cause a device to perform operations comprising:
transmitting a request for hypervisor data to a first server of a plurality of servers;
receiving the hypervisor data, in response to the request, identifying a first hypervisor executing on the first server of the plurality of servers, wherein the first hypervisor is allocated at least one virtual machine;
determining, based on the received hypervisor data, that the first hypervisor is violating at least one hypervisor condition; and
in response to determining that the first hypervisor is violating the at least one hypervisor condition:
transmitting a request for additional hypervisor data to the plurality of servers;
receiving the additional hypervisor data from at least one of the plurality of servers; and
determining, based on the additional hypervisor data, a second hypervisor that is not satisfying at least a second hypervisor condition;
wherein determining, based on the additional hypervisor data, the second hypervisor that is not satisfying at least the second hypervisor condition comprises:
determining a virtual machine processing power consumption for each of a plurality of hypervisors based on virtual machines running on each of the plurality hypervisors;
comparing the virtual machine processing power consumption for each of the plurality of hypervisors to a minimum threshold; and
determining the second hypervisor out of the plurality of hypervisors based on the comparisons; and
transmitting an allocation message to reallocate the at least one virtual machine from the first hypervisor to the second hypervisor, wherein the allocation message identifies a processing task of the at least one virtual machine.

16. The non-transitory computer readable medium of claim 15 further comprising instructions stored thereon that, when executed by at least one processor, further cause the device to perform operations comprising:
determining that the hypervisor data identifies processor consumption for the at least one virtual machine;
determining whether the processor consumption is beyond a threshold; and
determining that the first hypervisor is violating the at least one hypervisor condition when the processor consumption is beyond the threshold.

17. The non-transitory computer readable medium of claim 15 further comprising instructions stored thereon that, when executed by at least one processor, further cause the device to perform operations comprising:
determining that the hypervisor data identifies processor steal for the at least one virtual machine;

determining whether the processor consumption is beyond a threshold; and determining that the first hypervisor is violating the at least one hypervisor condition when the processor consumption is beyond the threshold.

18. The non-transitory computer readable medium of claim 15 further comprising instructions stored thereon that, when executed by at least one processor, further cause the device to perform operations comprising:

determining that the hypervisor data identifies a number of virtual machines allocated to the first hypervisor;

determining whether the number of virtual machines allocated to the first hypervisor is beyond a threshold; and determining that the first hypervisor is violating the at least one hypervisor condition when the number of virtual machines is beyond the threshold.

19. The non-transitory computer readable medium of claim 15 further comprising instructions stored thereon that, when executed by at least one processor, further cause the device to:

transmit a deallocation message to the first server of the plurality of servers to deallocate the at least one virtual machine from the first hypervisor; and transmit the allocation message to a second server of the plurality of servers to allocate the at least one virtual machine to the second hypervisor.

* * * * *